(12) United States Patent
Ishikawa et al.

(10) Patent No.: US 8,540,046 B2
(45) Date of Patent: Sep. 24, 2013

(54) ELECTRICAL UNIT LAYOUT STRUCTURE FOR SADDLE TYPE ELECTRIC VEHICLE

(75) Inventors: Jun Ishikawa, Wako (JP); Hiroyuki Nishimori, Wako (JP); Takeo Nakazawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/560,093

(22) Filed: Jul. 27, 2012

(65) Prior Publication Data
US 2013/0032426 A1 Feb. 7, 2013

(30) Foreign Application Priority Data
Aug. 3, 2011 (JP) .................. 2011-170075

(51) Int. Cl.
*B62M 7/00* (2010.01)
*B62K 11/02* (2006.01)
(52) U.S. Cl.
CPC ...................... *B62K 11/02* (2013.01)
USPC ....................................... 180/220

(58) Field of Classification Search
USPC ......................... 180/65.1, 65.8, 214, 216, 220
See application file for complete search history.

(56) References Cited

U.S. PATENT DOCUMENTS
2012/0103716 A1 * 5/2012 Fujihara et al. ............... 180/220

FOREIGN PATENT DOCUMENTS
JP          3949446 B2      4/2007

* cited by examiner

*Primary Examiner* — J. Allen Shriver, II
*Assistant Examiner* — Felicia L Brittman
(74) *Attorney, Agent, or Firm* — Squire Sanders (US) LLP

(57) ABSTRACT

An accelerator position sensor for detecting accelerator position is provided rearwardly of a head pipe and on the upper side of a main frame. A breaker for cutting off battery power supplied to a controller for performing drive control of a motor unit is provided on the accelerator position sensor. The breaker and the accelerator position sensor are covered with an electrical unit case provided with an opening part. The opening part is provided with a closing member by which the opening part can be opened and closed.

20 Claims, 9 Drawing Sheets

ELECTRICAL UNIT LAYOUT STRUCTURE FOR SADDLE TYPE ELECTRIC VEHICLE

BACKGROUND

1. Field

The present invention relates to an electrical unit layout structure for a saddle type electric vehicle.

2. Description of Related Art

Patent Document 1 (Japanese Patent No. 3949446) discloses a structure in a saddle type electric vehicle provided with a pair of left and right main frames, wherein a battery is mounted into a space between the main frames from a lateral side and is supported by the main frames.

Meanwhile, though Patent Document 1 discloses the mounting of the battery and the mounting of other electrical units, nothing is disclosed in the document about the maintenance of the electrical units on the electric vehicle.

In an electric vehicle, it is necessary to cut off the battery power supply at the time of maintenance of electrical units, and, therefore, the electric vehicle is provided with a breaker for cutting off the battery power supply. In general, the breaker also has a function to prevent an overcurrent from flowing to a motor, and the breaker is desirably laid out at a position surrounded by vehicle body parts such as a cowl, in order to prevent raindrops from entering to the breaker and prevent an external force from being exerted on the breaker.

However, in the case where access to the breaker is needed for disconnecting or resetting the breaker, such parts as the cowl must be detached from the vehicle body at each time of such an operation on the breaker. Thus, burden on the user is increased.

In addition, in the case where the breaker is laid out at such a position as a position under a frame, the degree of freedom in laying out electrical units such as a battery, a motor and a drive controller is lowered.

SUMMARY

The present invention has been made in consideration of the above-mentioned circumstances.

Accordingly, it is an object of the present invention to provide an electrical unit layout structure for a saddle type electric vehicle such that access to a breaker can be facilitated while preventing raindrops from entering to the breaker and preventing an external force from being inputted to the breaker, and that the degree of freedom in layout of a battery and the like can be enhanced.

In order to attain the above object, according to an embodiment of the invention, an electrical unit layout structure is provided for a saddle type electric vehicle having a driving motor disposed under a rear portion of a frame extending toward a vehicle rear side from a head pipe, and a battery disposed between the frame and the driving motor. The electrical unit layout structure can include an accelerator position sensor which is disposed rearwardly of the head pipe and on the upper side of the frame, and which detects accelerator position. A breaker is provided on the accelerator position sensor and by which a controller for performing drive control of the driving motor and a battery are mutually electrically connected and disconnected. A cover member covers the breaker and the accelerator position sensor. The cover member is provided with an opening part permitting the breaker to be operated from outside the cover member, and with a closing member for opening and closing the opening part.

According to another embodiment of the invention, the cover member can cover at least the upper side of the accelerator position sensor and the breaker. Also, the opening part can be provided on the upper side of the breaker.

According to another embodiment of the invention, an operating part of the breaker can be disposed above an upper end position of the accelerator position sensor.

According to another embodiment of the invention, the closing member can be a cap which can be attached and detached.

According to another embodiment of the invention, the cap is a screw type cap.

According to another embodiment of the invention, the closing member is a hinged type cap.

According to another embodiment of the invention, the cap is a spring-up type cap.

In certain embodiments, the accelerator position sensor is provided in a space rearwardly of the head pipe and on the upper side of the frame. This is effective in enhancing the degree of freedom in laying out electrical units such as the battery and a motor under the frame, as compared with the case where the accelerator position sensor is provided under the frame.

Further, with the breaker provided on the accelerator position sensor, the need for a bracket for fixing the breaker to the frame is eliminated. Accordingly, it is enabled to realize reductions in size and weight through a reduction in the number of component parts, as compared with the case where the accelerator position sensor and the breaker are individually fixed to the frame through brackets, for example.

Furthermore, easy access to the breaker is enabled by opening the closing member provided at the opening part of the cover member, so that the power supply can be easily cut off at the time of maintenance of the electrical units. In the case where the access to the breaker is unnecessary, it is possible by closing the closing member to prevent raindrops or dust from entering into the inside of the cover member through the opening part.

Therefore, it is possible to facilitate access to electrical units while preventing raindrops from entering to the breaker and preventing an external force from being inputted to the breaker. This makes it possible to enhance maintainability and to lessen the burden on the user. In addition, it is made possible to enhance the degree of freedom in laying out the electrical units.

According to other embodiments of the invention, the opening part is laid out on the upper side of the breaker, which is effective in ensuring an easy access to the breaker even when the driver is in a riding posture.

According to other embodiments of the invention, it is ensured that in the case where the opening part is laid out on the upper side of the breaker, the operating part of the breaker can be laid out close to the opening part, which promises enhancement of the operability of the operating part.

According to other embodiments of the invention, an easy access to the breaker through the opening part of the cover member is enabled by attaching and detaching of the cap.

According to other embodiments of the invention, the cap can be attached and detached by only turning the cap. Therefore, it is possible for the user to open and close the cap in an intuitive manner, whereby enhanced product quality can be promised.

According to other embodiments of the invention, the cap is attached to the cover member through the hinge, which is effective in preventing the cap from being disengaged or lost.

According to other embodiments of the invention, the cap is made to jump up by only a spring-up releasing operation, so that the cap can be easily opened.

DETAILED DESCRIPTION

Figure 1:
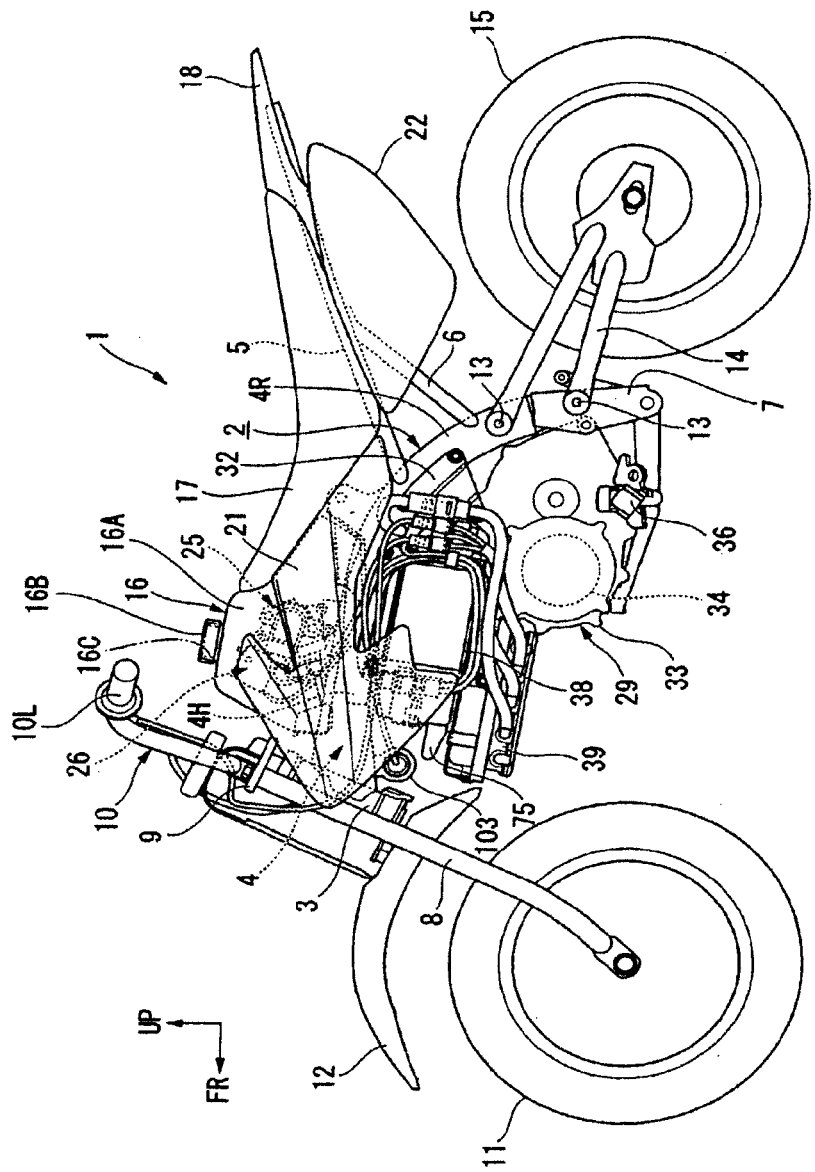
FIG. 1 is a left side view of a saddle type electric vehicle according to an embodiment of the present invention.

Embodiments of the present invention will be described below, based on the drawings. Incidentally, in the drawings used below, arrow FR indicates the front side of the vehicle, arrow UP indicates the upper side of the vehicle, and arrow LH indicates the left side of the vehicle.

Figure 2:
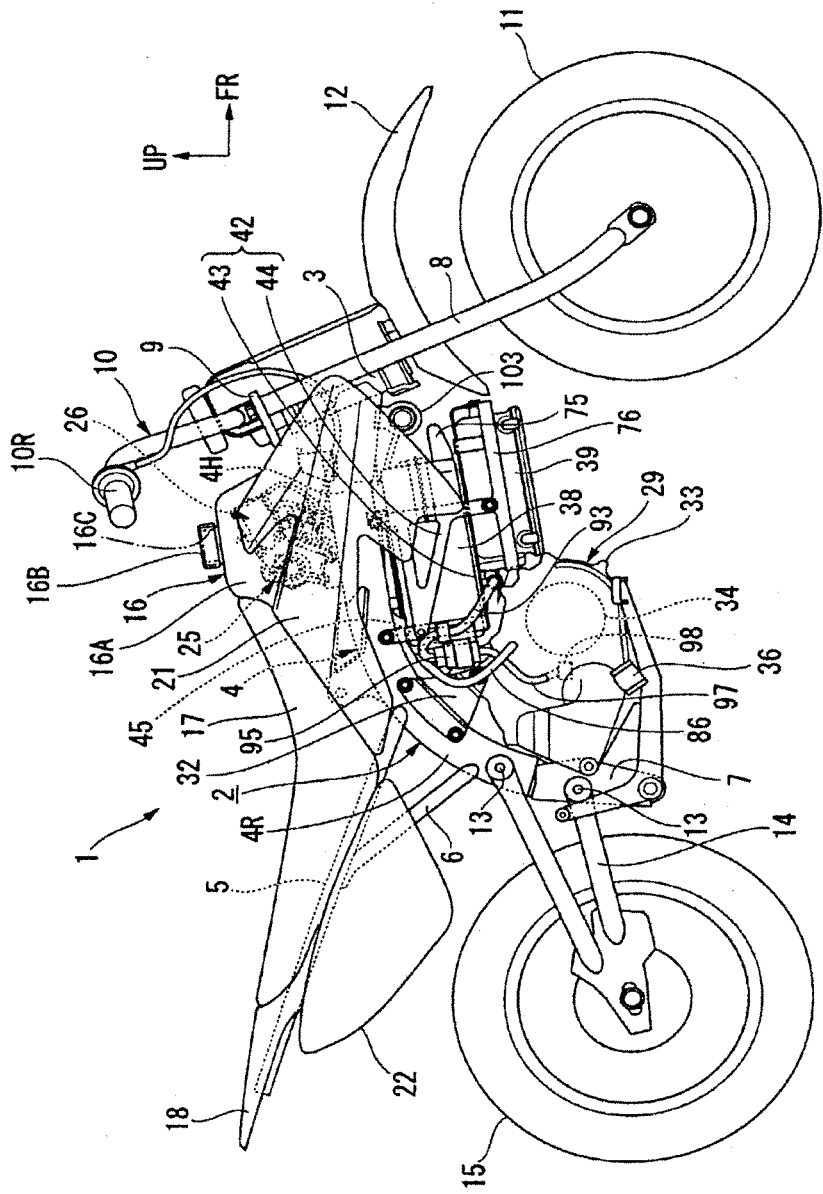
FIG. 2 is a right side view of the saddle type electric vehicle.
Figure 3:
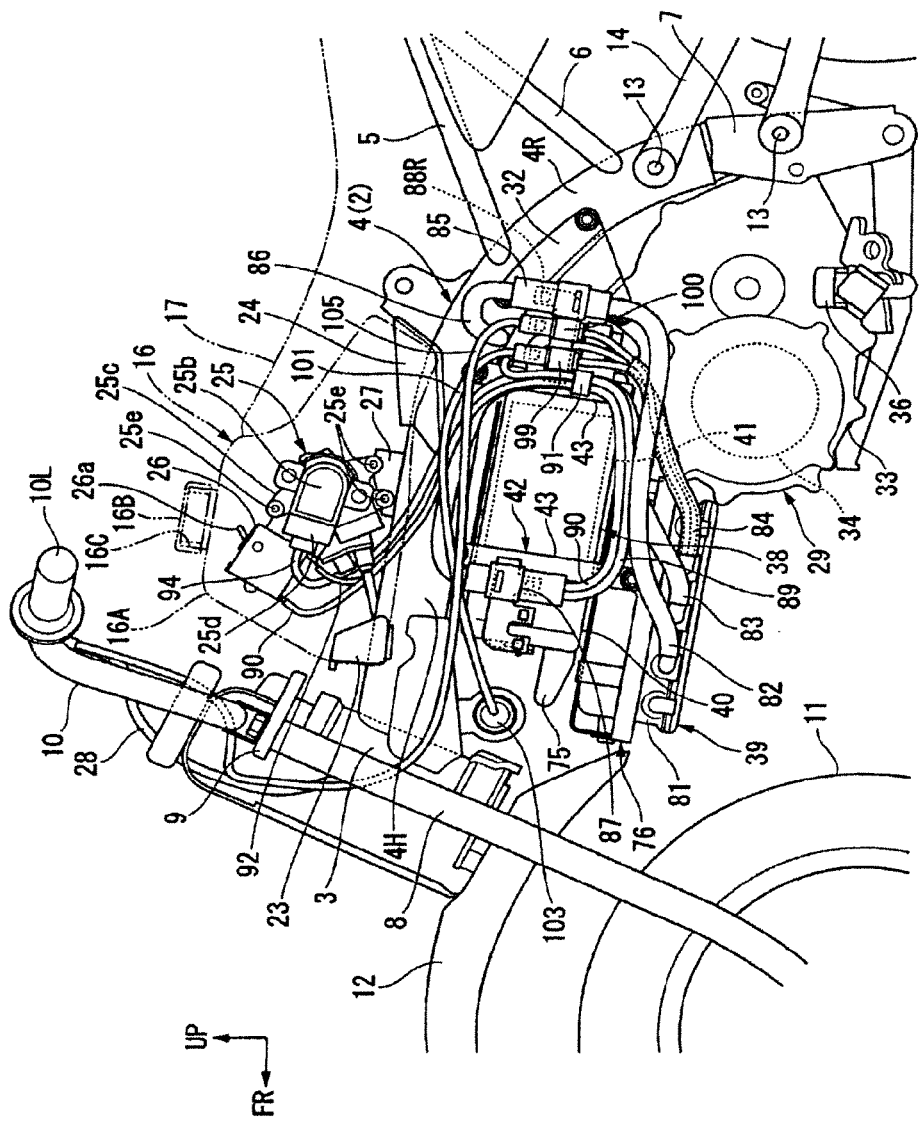
FIG. 3 is a left side view of a major part of the saddle type electric vehicle.

The saddle type electric vehicle 1 (hereinafter abridged to the vehicle 1) to which a structure according to this embodiment is applied, shown in FIGS. 1 to 3, is configured in one embodiment as a comparatively small-type off-road motorcycle.

A body frame 2 of the vehicle 1 has a main frame 4 which integrally includes a horizontal region 4H extending toward the vehicle rear side in a roughly horizontal state from a head pipe 3, and a curved region 4R extending downward in a curved form from the rear end of the horizontal region 4H. A pair of left and right seat rails 5, 5 extending rearwardly upward is connected to portions near a starting point of the curved region 4R of the main frame 4. A pair of left and right support frames 6, 6 by which a rear portion of the curved region 4R of the main frame 4 and fore-and-aft-directionally roughly central portions of the seat rails 5, 5 are interconnected is disposed under the seat rails 5, 5. In addition, a pair of left and right plates 7, 7 extending downward is connected to lower portions of the main frame 4.

Figure 4:
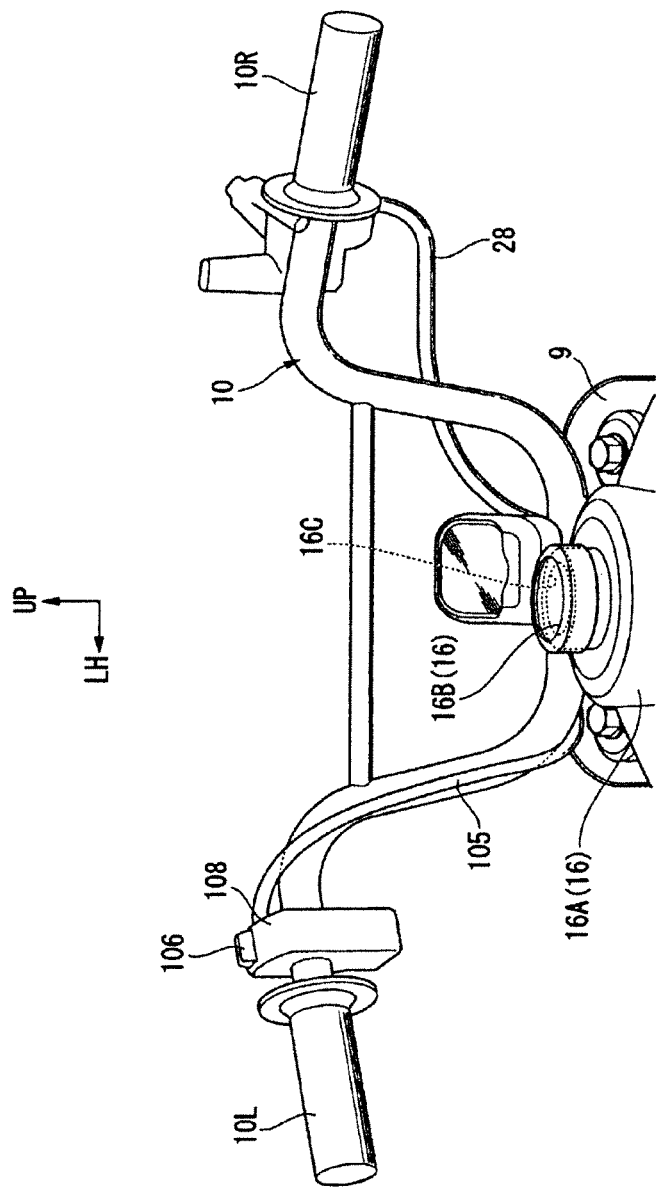
FIG. 4 is a rear view of a handle in the saddle type electric vehicle.

A pair of left and right front fork members 8, is steerably supported on the head pipe 3, and a bar handle 10 is fixed to a top bridge 9 by which upper portions of the front fork members 8, 8 are interconnected. Referring to FIG. 4, a hollow cylindrical left grip 10L is mounted to a left-side end portion of the bar handle 10, and a hollow cylindrical accelerator grip 10R which is rotatable about an axis is mounted to a right-side end portion of the bar handle 10.

A front wheel 11 is rotatably supported on lower portions of the front fork members 8, 8, and a resin-made front fender 12 for covering the upper side of the front wheel 11 is fixed to portions, between the front wheel 11 and the bar handle 10, of the front fork members 8, 8. Besides, the front ends of a pair of left and right rear arms 14, 14 are fixed to the plates 7, 7 through a pair of upper and lower shaft portions 13, 13, and a rear wheel 15 is rotatably supported on rear portions of the rear frames 14, 14.

An electrical unit case 16, modeled after a fuel tank of a motorcycle, is disposed on the upper side of the horizontal region 4H of the main frame 4. The electrical unit case 16 is so located as to extend in the fore-and-aft direction along the main frame 4. A seat 17 which is fixed to upper portions of the seat rails 5, 5 and on which to seat a rider is disposed rearwardly of the electrical unit case 16. The seat 17 extends in the fore-and-aft direction of the vehicle, and its front portion is laid onto a rear portion of the electrical unit case 16 from above. In addition, a resin-made rear fender 18 is fixed rearwardly of the seat 17 so as to extend rearward.

Figure 9:
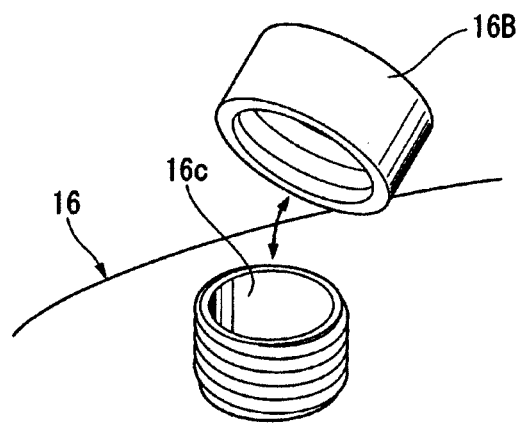
FIG. 9 is a perspective view of the cap in the saddle type electric vehicle.

The electrical unit case 16 has a case body 16A and a cap 16B. The case body 16A is formed, roughly in the center of its upper surface slightly slanted rearward, with an opening part 16C opening while projecting upward. Referring to FIG. 9, the cap 16B is a screw type cap, and the cap 16B is detachably screw-engaged with the opening part 16C. Incidentally, the screw type cap 16B may be provided with a strap for preventing the cap 16B from dropping. In addition, as a system in which the cap is attached to and detached from the opening part 16C by rotation, other system than the above-mentioned screw-type system may be adopted. For example, a system may be adopted in which a lock piece formed on either one of a cap and the opening part 16C is inserted into a key groove formed in the other of the cap and the opening part 16C and is turned to thereby achieve locking.

Figure 7:
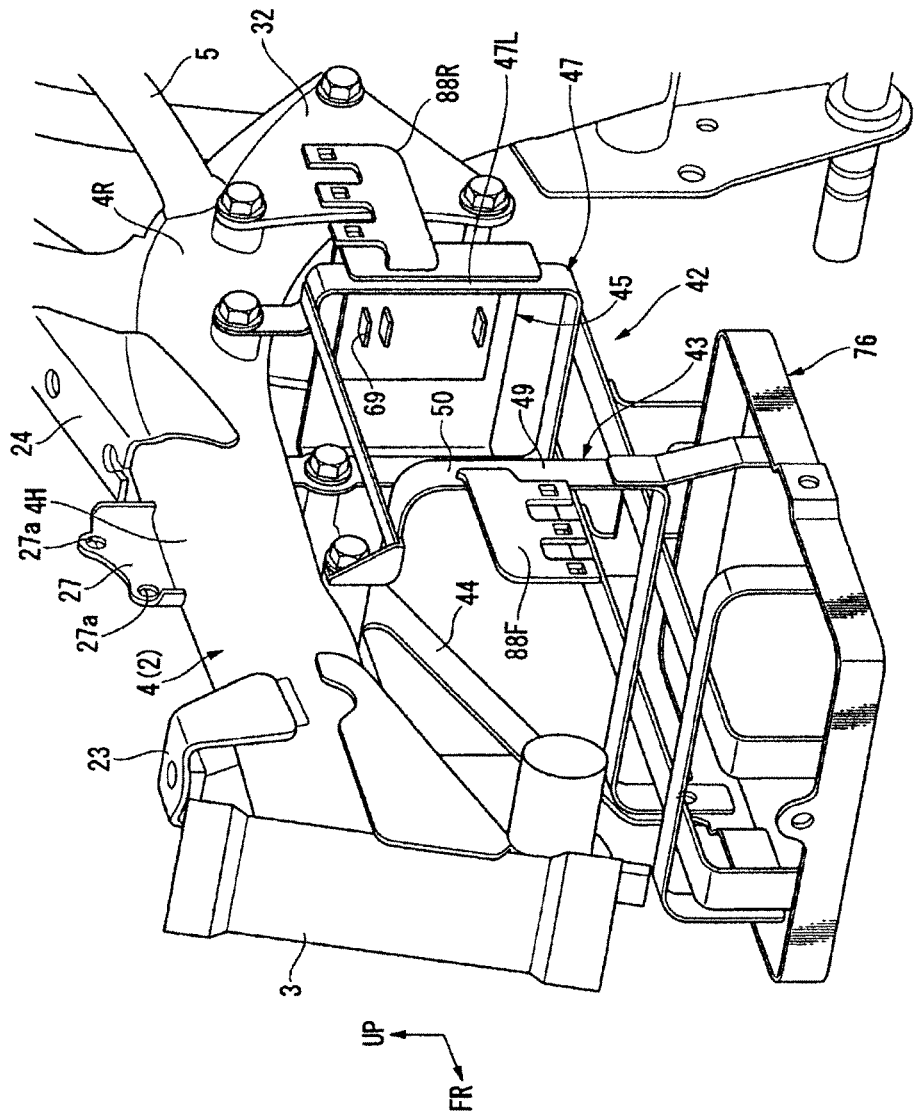
FIG. 7 is a perspective view, as viewed from a left front side, of the battery holder in the saddle type electric vehicle.

The case body 16A has front and rear walls and left and right side walls extending in the manner of broadening along a downward direction from an upper surface formed with the opening part 16C. Referring to FIGS. 3 and 7, a front-side bracket 23 is welded to front-side upper portions of the horizontal region 4H of the main frame 4, and a rear-side bracket 24 is welded to rear portions of the horizontal region 4H. The electrical unit case 16 is fixed to the brackets 23 and 24.

The electrical unit case 16 has its left and right side walls covered with side cowls 21, 21. A pair of left and right rear cowls 22, 22 is disposed under a rear portion of the seat 17. The rear cowls 22, 22 are fixed to the seat rails 5, 5, and cover a part of the support frames 6, 6. As above-mentioned, the electrical unit case 16 has the side walls, and the side walls are covered with the side cowls 21, 21, whereby the driver's knee grip is made easier to perform.

Figure 5:
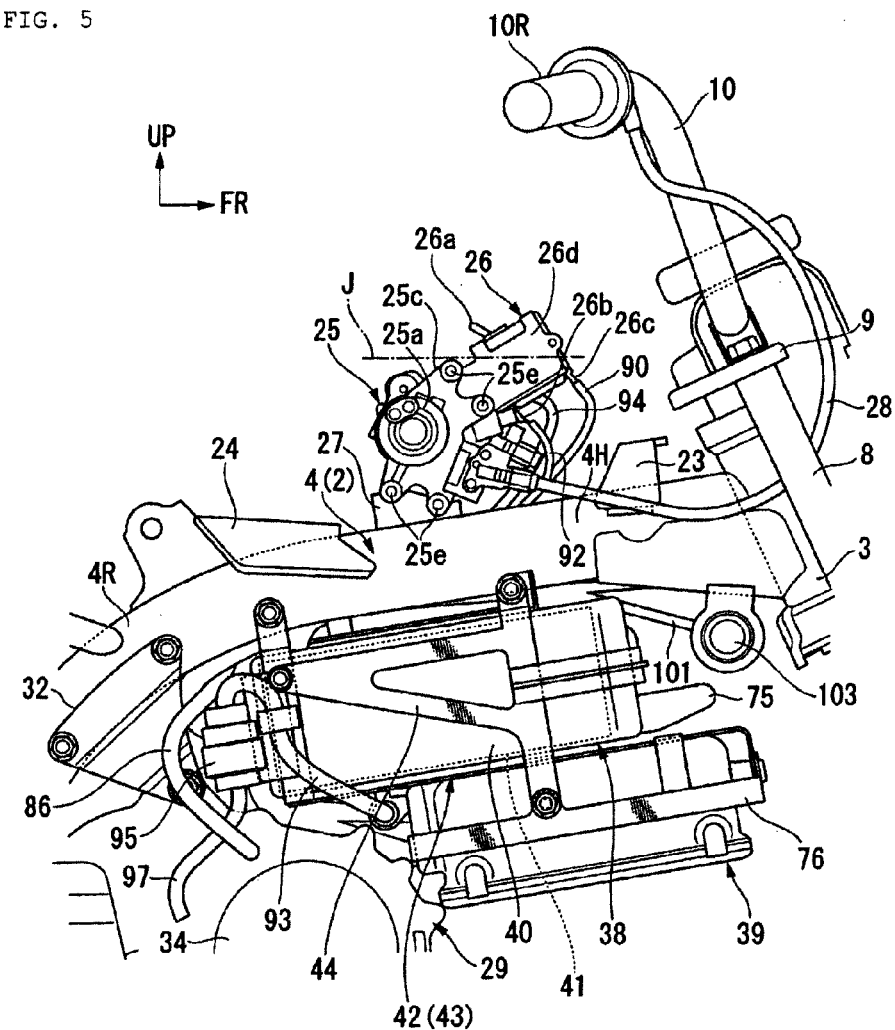
FIG. 5 is a right side view of a major part of the saddle type electric vehicle.

Referring to FIGS. 3 and 5, a pair of left and right plate-shaped suspension brackets 32, 32 is fastened to an upper portion of the curved region 4R of the main frame 4. A motor unit 29 has its upper portion fixed to the suspension brackets 32, 32, and has its rear portion fixed to front portions of the plates 7, 7, whereby it is suspended on the main frame 4. As shown in FIGS. 1 and 2, the motor unit 29 is so configured as to have a driving motor body 34 contained on the front side in the unit case 33 and have a decelerator (not shown) contained on the rear side in the unit case 33. In addition, left and right steps 36, 36 are disposed at lower portions of the unit case 33.

A battery unit 38 is disposed between the main frame 4 and the motor unit 29 in the vertical direction of the vehicle, and a controller 39 for controlling power supply to the motor unit 29 is disposed under the battery unit 38.

Referring to FIGS. 3 and 5, the battery unit 38 has a configuration wherein a battery 41 composed of a plurality of lithium secondary cells is contained in a battery case 40 which is rectangular in shape in side view and of which the longitudinal direction is set along the fore-and-aft direction of the vehicle. Electric power of the battery 41 is supplied to the motor unit 29 through the controller 39. Incidentally, reference symbol 75 in the figures denotes a handle to be gripped by the user.

Figure 6:
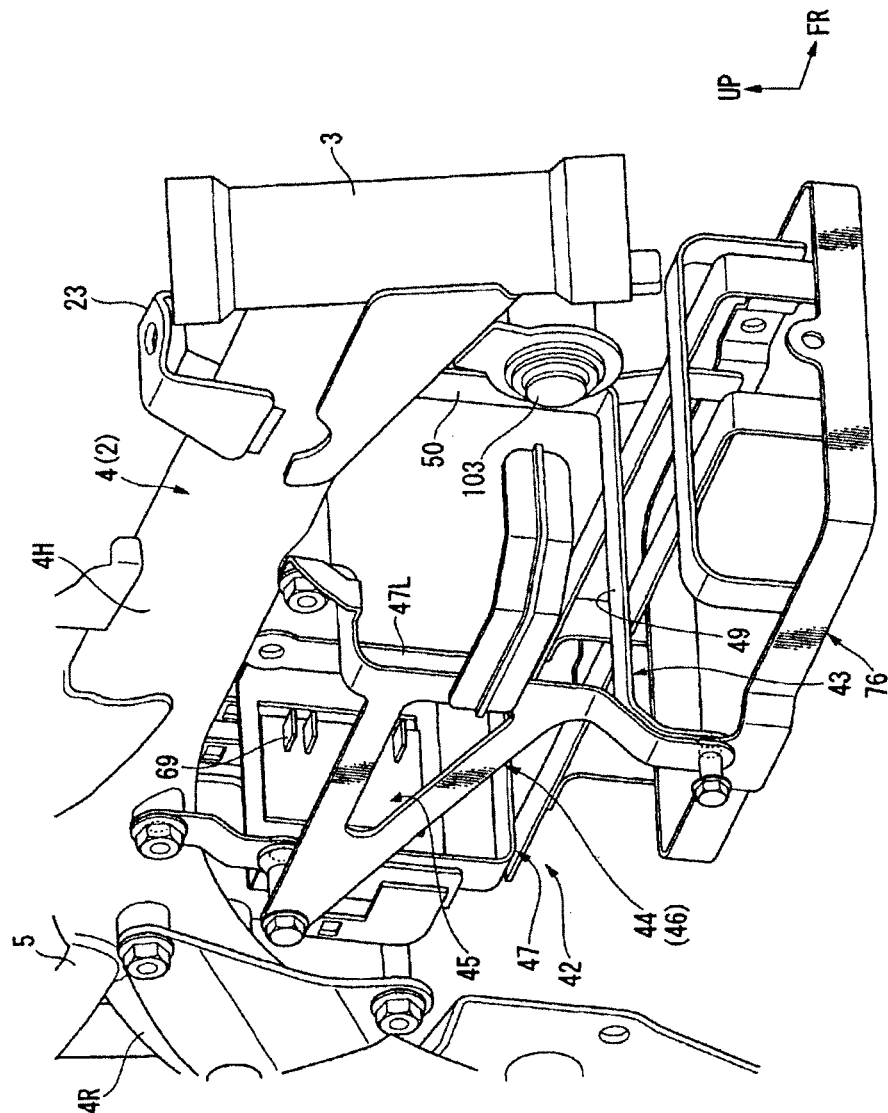
FIG. 6 is a perspective view, as viewed from a right front side, of a battery holder in the saddle type electric vehicle.

The battery unit 38 is contained in a battery holder 42 suspended on the horizontal region 4H of the main frame 4. Referring to FIGS. 6 and 7, the battery holder 42 can include a holder body portion 43 for containing and holding the battery unit 38, and a plate member 44 which can be detached from the holder body portion 43 to the vehicle right side and which restrains lateral movement of the battery unit 38. A terminal part can be provided at a rear part of the holder body portion 43 and is used for connection for power supply from the battery unit 38 to the motor unit 29.

As shown in FIG. 5, a controller fixing part 76 formed of sheet metal material is welded to a lower portion of the battery holder 42. The controller 39 is fixed and supported by the controller fixing part 76. The controller fixing part 76 fixes the controller 39 in such a manner that the controller 39 is located forwardly of the motor unit 29 and below the battery unit 38.

Meanwhile, as shown in FIGS. 3 and 7, the accelerator position sensor 25 and the breaker 26 can be disposed inside the electrical unit case 16. To a central upper portion of the horizontal region 4H of the main frame 4 covered by the electrical unit case 16, a sensor bracket 27 for fixing the accelerator position sensor 25 is welded in the state of protruding upward. As shown in FIG. 7, the sensor bracket 27 is formed in a roughly plate-like shape along the extending direction of the main frame 4, and its upper edge is slanted obliquely downward from the rear side toward the front side of the vehicle. The sensor bracket 27 is formed with a pair of mounting holes 27a at front and rear positions near the upper edge thereof. The accelerator position sensor 25 is fixed by fastening bolts to the mounting holes 27a. Furthermore, the front and rear ends of the sensor bracket 27 are formed in a bent shape for enhancing support strength.

Referring to FIGS. 3 and 5, the accelerator position sensor 25 detects rotational operating amount of the accelerator grip 10R through an accelerator cable 28. Based on the rotational operating amount thus detected, an output from the motor unit 29 disposed under a rear portion of the horizontal region 4H of the main frame 4 is controlled.

The accelerator position sensor 25 can include a drum portion 25a around which an inner cable of the accelerator cable 28 pushed or pulled according to the operating amount of the accelerator grip 10R is elastically wound. A potentiometer portion 25b can be provided, and can have a rotational axis in common with the drum portion 25a and detects the rotational position thereof. A support member 25c onto which the drum portion 25a and the potentiometer portion 25b are fixed can be provided on the left and right sides, respectively. To the front side of the potentiometer portion 25b, an accelerator sensor harness 94 for outputting the detection results to the controller 39 is detachably connected through a connector 25d. The accelerator cable is connected at its one end to the accelerator grip 10R, extends from the accelerator grip 10R toward the lower side on the vehicle-width-directionally inner side, then extends through the space between the front fork members under the top bridge toward the vehicle rear side, and is connected at its other end to the accelerator position sensor 25 from a slightly obliquely lower side on the vehicle front side.

The support member 25c of the accelerator position sensor 25 is formed in the shape of being curved and a little recessed from the vehicle front side, and is provided with a pair of mounting holes 25a near each of the upper edge and the lower edge thereof. The support member 25c is so oriented that its face-and-back direction coincides with the vehicle width direction (left-right direction), and, in such a posture that the upper edge of the recessed and curved shape is directed toward the vehicle front side, the pair of mounting holes 25e are fastened to the mounting holes 27a near the upper edge of the sensor bracket 27. This results in that the support member 25c is mounted to the sensor bracket 27 in the posture of being slightly tilted to the vehicle front side. Incidentally, for convenience of drawing, fastening members for fastening the support member 25c and the sensor bracket 27 to each other are omitted.

The breaker 26 is a so-called no-fuse type breaker which is cut off when an overcurrent flows. The breaker 26 is connected between a positive electrode terminal 69 (see FIG. 7) of the battery unit 38 and a motor power plus input terminal (not shown) of the motor unit 29. The breaker 26 is formed in a box shape which is flat in the left-right direction, and a lever 26a for operating cut-off and reset (return) is disposed on the upper surface side of the breaker 26. The lever 26a can be swung along the fore-and-aft direction of the breaker 26, namely, along the longitudinal direction of the upper surface of the breaker 26. On the other hand, on the lower surface side of the breaker 26, a primary-side terminal 26b and a secondary-side terminal 26c to be connected to contacts of the breaker 26 are disposed respectively at the lower surface front edge and the lower surface rear edge. An upstream-side positive electrode harness 92 for leading to the positive electrode terminal 69 of the battery unit 38 is connected to the primary-side terminal 26b, while a downstream-side positive electrode harness 90 for leading to the motor power plus input terminal (not shown) of the motor unit 29 is connected to the secondary-side terminal 26c.

A roughly rectangular plate-like fixture 26d extending rearward is mounted to the right side surface of the breaker 26. The fixture 26d is formed near its rear edge with a pair of mounting holes (not shown). This pair of mounting holes are fixed to the above-mentioned pair of mounting holes 25e formed in a front-side upper portion of the accelerator position sensor 25, specifically, near the upper edge of the support member 25c, through fastening members which are not shown. In this fixed state, the breaker 26 is integrally fixed to the accelerator position sensor 25 in the state of having its lower surface and upper surface inclined toward a front upper side, according to the inclination of the support member 25c of the accelerator position sensor 25 mentioned above. The accelerator position sensor 25 and the breaker 26 thus integrally fixed are fixed to the sensor bracket 27 disposed at the horizontal region 4H of the main frame 4 and protruding upward, whereby they are disposed rearwardly of the head pipe 3 and on the upper side of the main frame 4.

Referring to FIG. 5, the lever 26a of the breaker 26 is disposed above the upper end position J of the accelerator position sensor 25. Referring to FIG. 3, the breaker 26 is disposed directly under and close to the opening part 16C of the electrical unit case 16, and the lever 26a of the breaker 26 is disposed under the opening part 16C of the electrical unit case 16. In other words, the opening part 16C is disposed on the upper side of the breaker 26 mounted to the accelerator position sensor 25. This ensures that when the cap 16B is detached from the opening part 16C, the lever 26a is accessible through the opening part 16C. Furthermore, the upper surface of the breaker 26 is so inclined as to be oriented toward the user side, when the user is in the riding posture. Therefore, the lever 26a can be operated by the user easily and swiftly even when the user is in the riding posture. Incidentally, details of laying of the harnesses 90, 92 and 94 connected to the accelerator position sensor 25 and the breaker 26 will be described later.

Figure 8:
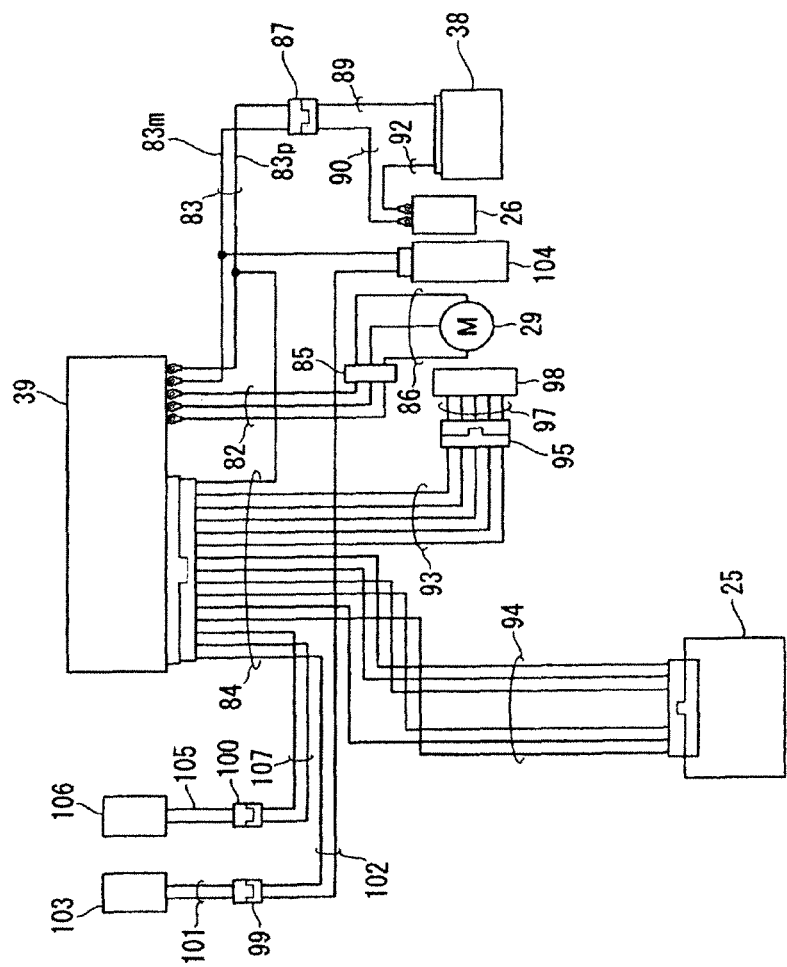
FIG. 8 is a wiring diagram for the saddle type electric vehicle.

As shown in FIG. 3, the controller 39 has electrical units such as a driver contained in a case 81. A downstream-side motor harness 82, a power supply harness 83 and a sensor harness 84 are connected, at positions arranged in this order from the front side, to the left side surface of the case 81. FIG. 8 shows a wiring diagram for various harnesses in the vehicle 1. Referring to the figure as well, the laying of the various harnesses will be described below.

The downstream-side motor harness 82 is led out rearward from the controller 39, and is connected to a lower portion of a motor coupler 85. The motor coupler 85 is fixed to a rear portion side of a rear-side coupler holding plate 88R which is fixed to a downwardly extending part 47L of a rear-side frame portion 47, as shown in FIG. 7. The rear-side coupler holding plate 88R is provided with a coupler mounting part at each of a front portion, a rear portion, and a central portion between the front portion and the rear portion.

An upstream-side motor harness 86 connected to an upper portion of the motor coupler 85 is led out forward, is extended past a rear portion of the battery unit 38, and is connected to the driving motor body 34 via a right side surface of the motor unit 29, as shown in FIG. 2.

As shown in FIG. 8, the power supply harness 83 includes an upstream-side negative electrode harness 83m and a downstream-side positive electrode harness 83p, which are led out rearward from the controller 39. The power supply harness 83 is curved forward from the vicinity of a rear portion of the battery unit 38 in side view, and is connected to an upper portion of a power supply coupler 87. The power supply coupler 87 is fixed to a rear portion of a front-side coupler holding plate 88F which is fixed to a downwardly extending part 50 of a front-side frame portion 49, as shown in FIG. 7. The front-side coupler holding plate 88F is provided with a coupler mounting part at each of a front portion, a rear portion, and a central portion between the front portion and the rear portion.

A downstream-side negative electrode harness 89 and a downstream-side positive electrode harness 90 are connected to a lower portion of the power supply coupler 87, and pass currents to the upstream-side negative electrode harness 83m and the downstream-side positive electrode harness 83p, respectively. The downstream-side negative electrode harness 89 and the downstream-side positive electrode harness 90 are led out rearward. The downstream-side negative electrode harness 89 is led out to a rear portion of the battery unit 38, and passes a current to the battery unit 38. The downstream-side positive electrode harness 90 is curved upward, and is connected to the breaker 26. Here, the power supply harness 83, the downstream-side negative electrode harness 89, and the downstream-side positive electrode harness 90 are bundled with a clip 91.

Furthermore, referring to FIGS. 3 and 8, the upstream-side positive electrode harness 92 is connected to the breaker 26. This breaker-side positive electrode harness 92 is led out to a lower portion of the battery unit 38, and passes a current to the battery unit 38.

In addition, as shown in FIG. 8, the sensor harness 84 includes a plurality of harnesses, of which a rotation sensor harness 93 (refer to FIG. 5) extends from the controller 39 and across a rear portion of the battery unit 38, and is connected to an upper portion of the rotation sensor coupler 95 disposed rearwardly of the battery unit 38. A connection harness 97 is connected to a lower portion of the rotation sensor coupler 95. The connection harness 97 is connected via a right side surface of the motor unit 29 to a rotation sensor 98 contained in the inside of the motor unit 29, as shown in FIG. 2.

Besides, as shown in FIG. 3, an accelerator sensor harness 94 in the sensor harness 84 is led out rearward from the controller 39, is curved upward from the vicinity of a rear portion of the battery unit 38, and is connected to the accelerator position sensor 25.

Furthermore, as shown in FIGS. 3 and 8, a main switch coupler 99 and a kill switch coupler 100 are fixed to the rear-side coupler holding plate 88R. Referring to FIG. 8, a first harness 101 and a second harness 102 are led out from the main switch coupler 99. The first harness 101 is connected to a main switch 103, whereas the second harness 102 is branched, to be connected to a fuse 104 and the controller 39. Referring to FIG. 5, the main switch 103 is fixed to a front end lower portion of the main frame 4.

On the other hand, a third harness 105 led out from the kill switch coupler 100 is connected to a kill switch 106, and a fourth harness 107 to the controller 39. Referring to FIG. 4, the kill switch 106 is provided at a switch box 108 which is disposed proximate to the left grip 10L of the bar handle 10.

As described above, in the saddle type electric vehicle 1, the motor unit 29 is disposed under a rear portion of the main frame 4 extending toward the vehicle rear side from the head pipe 3, and the battery unit 38 is disposed between the main frame 4 and the motor unit 29. In addition, the accelerator position sensor 25 for detecting the accelerator position is provided at a location rearwardly of the head pipe 3 and on the upper side of the main frame 4.

In such a structure, it is possible to enhance the degree of freedom in laying out the battery unit 38 and the motor unit 29 and the like on the lower side of the main frame 4 where the battery unit 38 and the motor unit 29 and the like are to be laid out, as compared with the case where the accelerator position sensor 25 is provided on the lower side of the main frame 4.

Furthermore, the saddle type electric vehicle 1 includes the breaker 26 which is provided on the accelerator position sensor 25 and by which the controller 39 for drive control of the motor unit 29 and the battery unit 38 are mutually electrically connected and disconnected, and the electrical unit case 16 which covers the breaker 26 and the accelerator position sensor 25. The electrical unit case 16 is provided with the opening part 16C enabling access to the breaker 26 from the outside of the electrical unit case 16, and with the cap 16B for opening and closing the opening part 16C.

In such a structure, the need for a bracket for fixing the breaker 26 to the main frame 4 is eliminated and, accordingly, it is possible to reduce the number of component parts and thereby to contrive reductions in size and weight, as compared with the case where the accelerator position sensor 25 and the breaker 26 are individually fixed to the main frame 4 through brackets, for example. Furthermore, since an easy access to the breaker 26 can be secured by opening the cap 16B provided on the opening part 16C of the electrical unit case 16, the power supply can be easily cut off at the time of maintenance of electrical units. In addition, when access to the breaker 26 is unnecessary, it is possible, by closing the cap 16B, to prevent raindrops or dust from entering into the inside of the electrical unit case 16 through the opening part 16C. Furthermore, by attaching and detaching the cap 16B, it is easy to make access to the breaker 26 via the opening part 16C of the electrical unit case 16. In short, while preventing raindrops from entering to the breaker 26 and preventing an external force from being inputted to the breaker 26 it is possible to facilitate access to the electrical units, thereby enhancing maintainability and lightening the burden on the user, and to enhance the degree of freedom in laying out the electrical units.

Furthermore, in the saddle type electric vehicle 1, the electrical unit case 16 covers at least the upper side of the accelerator position sensor 25 and the breaker 26, and the opening part 16C of the electrical unit case 16 is provided on the upper side of the breaker 26.

Such a structure enables an easy access to the breaker 26, even when the driver is in the riding posture.

Furthermore, in the saddle type electric vehicle 1, the lever 26a of the breaker 26 is disposed above the upper end position J of the accelerator position sensor 25.

Such a structure ensures that in the case where the opening part 16C is disposed above the breaker 26, the lever 26a of the breaker 26 can be disposed closer to the opening part 26C, which promises enhanced operability of the lever 26a.

Furthermore, in the saddle type electric vehicle 1, the cap 16B is an attachable and detachable cap.

In such a structure, access to the breaker 26 can be easily made through the opening part 16C of the electrical unit case 16, by attaching and detaching the cap 16B.

In addition, in the saddle type electric vehicle 1, the cap 16B is a screw type cap.

Such a structure makes it possible to attach and detach the cap 16B by only turning the cap 16B. Therefore, the user can open and close the cap 16B intuitively, whereby enhanced product quality can be contrived.

While an embodiment of the present invention has been described above, the invention is not limited to the above embodiment, and modifications can be appropriately made within the scope of the gist of the invention.

Figure 10:
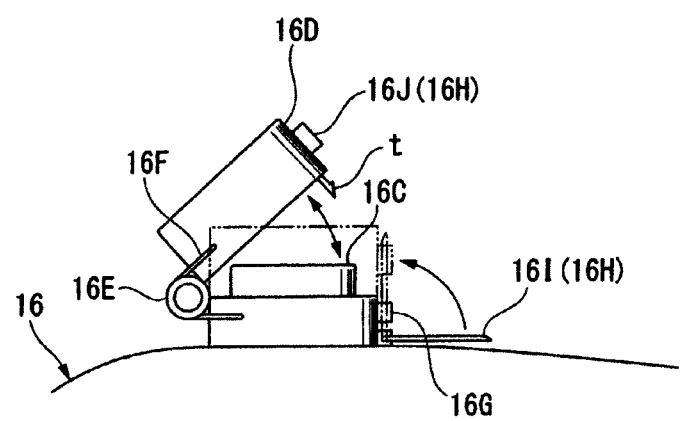
FIG. 10 is a side view of the cap in another embodiment.

For instance, while a case wherein the opening part 16C can be opened and closed with the screw type cap 16B has been described as an example in the saddle type electric vehicle 1 according to the above embodiment, this is not restrictive; for example, a hinged type cap 16D may be used, as in another embodiment shown in FIG. 10. In this case, since the cap 16D is attached to the electrical unit case 16 through a hinge 16E, the cap 16D can be prevented from being disengaged or being lost.

The hinged type cap 16D shown in FIG. 10 is a spring-up type cap biased toward the open side by a coil spring 16F, and, in its closed state, a lock claw t is locked to the opening part 16C, whereby the closed state is maintained. When a release button 16G is operated in the state in which the cap 16D is closed, the locked state by the lock claw t is released, and the cap 16D is displaced toward the open side. Thus, by only effecting a releasing operation by use of the release button 16G, the cap is made to spring up, and, accordingly, the cap can be easily opened.

Furthermore, the hinged type cap 16D is provided with a lock mechanism 16H. The lock mechanism 16H includes a lock ring portion 16I which is swingably supported on a side portion on the opposite side of the opening part 16C from the hinge 16E, and a locking projection 16J which projects from a side surface of the cap 16D. When the cap 16D is put in a closed state and the lock ring portion 16I is raised up in the direction of arrow in FIG. 10, an upper end part of the lock ring portion 16I is disposed on the upper side of the locking projection 16J, whereby the locking projection 16J is restrained from moving upward, namely, from being displaced in the opening direction of the cap 16D. In short, by raising up the lock ring portion 16I of the lock mechanism 16H, it is possible to prevent the cap 16D from opening, even if an unintended operation of the release button 16G is made.

Incidentally, while a case wherein the hinged type cap is provided with the coil spring 16F and the lock mechanism 16H has been described in the above embodiment, the coil spring 16F and the lock mechanism 16H may be omitted. In addition, while the coil spring 16F and the lock mechanism 16H have been described as an example, the configuration based on the coil spring 16F and the lock mechanism 16H is not restrictive, insofar as the cap 16D can be biased and can be restrained from being displaced in the opening direction.

In addition, while an example in which a single main frame 4 is used has been described in the above embodiment, the present invention may be applied to a saddle type electric vehicle which, for example, has a pair of left and right main frames instead of the single main frame 4. Here, the saddle type electric vehicle as above-described includes generally those vehicles on which a rider can ride astride a vehicle body; thus, the saddle type electric vehicle includes not only motorcycles but also three-wheeled vehicle (including two-front-wheel one-rear-wheel vehicles as well as one-front-wheel two-rear-wheel vehicles) and four-wheeled vehicles.

DESCRIPTION OF REFERENCE SYMBOLS

3 Head pipe
4 Main frame (frame)
16 Electrical unit case (cover member)
16B Cap (closing member)
16C Opening part
25 Accelerator position sensor
26 Breaker
26a Lever (operating portion)
29 Motor unit (driving motor)
38 Battery unit (battery)
39 Controller (control device)

The invention claimed is:

1. An electrical unit layout structure for a saddle type electric vehicle having a driving motor disposed under a rear portion of a frame extending toward a vehicle rear side from a head pipe, and a battery disposed between the frame and the driving motor, the electrical unit layout structure comprising:
   an accelerator position sensor which is disposed rearwardly of the head pipe and on the upper side of the frame, said accelerator position sensor configured to detect accelerator position;
   a breaker which is provided on the accelerator position sensor and by which a controller for performing drive control of the driving motor and the battery are mutually electrically connected and disconnected; and
   a cover member covering the breaker and the accelerator position sensor,
   wherein the cover member is provided with an opening part permitting the breaker to be operated from outside the cover member, and with a closing member for opening and closing the opening part.

2. The electrical unit layout structure according to claim 1, wherein the cover member covers at least the upper side of the accelerator position sensor and the breaker, and the opening part is provided on the upper side of the breaker.

3. The electrical unit layout structure according to claim 1, wherein an operating part of the breaker is disposed above an upper end position of the accelerator position sensor.

4. The electrical unit layout structure according to claim 1, wherein the closing member comprises a cap which can be attached and detached.

5. The electrical unit layout structure according to claim 4, wherein the cap comprises a screw type cap.

6. The electrical unit layout structure according to claim 1, wherein the closing member comprises a hinged type cap.

7. The electrical unit layout structure according to claim 6, wherein the cap comprises a spring-up type cap.

8. A vehicle, comprising:
   a frame including a head pipe;
   a driving motor disposed under a rear portion of said frame extending toward a vehicle rear side from the head pipe;
   a battery disposed between the frame and the driving motor;

an accelerator position sensor which is disposed rearwardly of the head pipe and on the upper side of the frame, said accelerator position sensor configured to detect accelerator position;
a breaker which is provided on the accelerator position sensor and by which a controller for performing drive control of the driving motor and the battery are mutually electrically connected and disconnected; and
a cover member covering the breaker and the accelerator position sensor,
wherein the cover member is provided with an opening part permitting the breaker to be operated from outside the cover member, and with a closing member for opening and closing the opening part.

9. The vehicle according to claim 8, wherein the cover member covers at least the upper side of the accelerator position sensor and the breaker, and the opening part is provided on the upper side of the breaker.

10. The vehicle according to claim 8, wherein an operating part of the breaker is disposed above an upper end position of the accelerator position sensor.

11. The vehicle according to claim 8, wherein the closing member comprises a cap which can be attached and detached.

12. The vehicle according to claim 11, wherein the cap comprises a screw type cap.

13. The vehicle according to claim 8, wherein the closing member comprises a hinged type cap.

14. The vehicle according to claim 13, wherein the cap comprises a spring-up type cap.

15. An electrical unit layout structure for a saddle type electric vehicle having a driving motor disposed under a rear portion of a frame extending toward a vehicle rear side from a head pipe, and a battery disposed between the frame and the driving motor, the electrical unit layout structure comprising:
sensor means for detecting an accelerator position, said sensor means being disposed rearwardly of the head pipe and on the upper side of the frame;
breaker means disposed on the sensor means, said breaker means for mutually electrically connecting and disconnecting a controller for performing drive control of the driving motor to and from the battery;
cover means for covering the breaker means and the sensor means,
wherein the cover means includes an opening part permitting the breaker means to be operated from outside the cover means, and with a closing means for opening and closing the opening part.

16. The electrical unit layout structure according to claim 15, wherein the cover means covers at least the upper side of the sensor means and the breaker means, and wherein the opening part is provided on the upper side of the breaker means.

17. The electrical unit layout structure according to claim 15, wherein an operating part of the breaker means is disposed above an upper end position of the sensor means.

18. The electrical unit layout structure according to claim 15, wherein the closing means comprises a cap which can be attached and detached.

19. The electrical unit layout structure according to claim 18, wherein the cap comprises a screw type cap.

20. The electrical unit layout structure according to claim 15, wherein the closing means comprises a hinged type cap.

* * * * *